(12) United States Patent
Schulz et al.

(10) Patent No.: US 11,442,478 B2
(45) Date of Patent: Sep. 13, 2022

(54) PRESSURE CONTROL DEVICE

(71) Applicant: HYDAC FLUIDTECHNIK GMBH, Sulzbach/Saar (DE)

(72) Inventors: Frank Schulz, Blieskastel-Bierbach (DE); Michael Reik, Saarbruecken (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 15/579,651

(22) PCT Filed: Jun. 2, 2016

(86) PCT No.: PCT/EP2016/000897
§ 371 (c)(1),
(2) Date: Dec. 5, 2017

(87) PCT Pub. No.: WO2016/198149
PCT Pub. Date: Dec. 15, 2016

(65) Prior Publication Data
US 2018/0173253 A1    Jun. 21, 2018

(30) Foreign Application Priority Data
Jun. 9, 2015  (DE) .................... 10 2015 007 424.5

(51) Int. Cl.
*F16K 31/02* (2006.01)
*G05D 16/20* (2006.01)
(Continued)

(52) U.S. Cl.
CPC ....... *G05D 16/202* (2013.01); *G05D 16/2033* (2013.01); *G05D 16/2053* (2013.01);
(Continued)

(58) Field of Classification Search
CPC ............. G05D 15/2033; G05D 15/202; G05D 15/2053; G05D 15/2026; G05D 15/2046;
(Continued)

(56) References Cited

U.S. PATENT DOCUMENTS 3,210,626 A * 10/1965 Wierzbicki ............... G05B 6/02
318/448
3,858,598 A * 1/1975 Carman ............. G05D 16/2053
137/102

(Continued)

FOREIGN PATENT DOCUMENTS

DE   36 27 278   3/1987
DE   43 31 930   3/1995
(Continued)

OTHER PUBLICATIONS

International Search Report (ISR) dated Aug. 10, 2016 in International (PCT) Application No. PCT/EP2016/000897.

*Primary Examiner* — Minh Q Le
(74) *Attorney, Agent, or Firm* — Wenderoth, Lind & Ponack, L.L.P.

(57) ABSTRACT

A pressure control device has at least two switching valves (10, 12), a feedback control unit (14), a sensor unit (20), and a voltage supply unit (24), and continuously adjusts hydraulic systems.

16 Claims, 2 Drawing Sheets

(51) Int. Cl.
  *G05B 6/02* (2006.01)
  *G05B 11/01* (2006.01)

(52) U.S. Cl.
  CPC .............. *G05B 6/02* (2013.01); *G05B 11/01* (2013.01); *G05D 16/2026* (2013.01); *G05D 16/2046* (2013.01)

(58) Field of Classification Search
  CPC ............ G05D 16/2033; G05D 16/202; G05D 16/2053; G05D 16/2026; G05D 16/2046; G05B 6/02; G05B 11/01
  USPC ........ 137/596.17, 596.16, 487.5; 188/322.13
  See application file for complete search history.

(56) References Cited

U.S. PATENT DOCUMENTS

| | | | | |
|---|---|---|---|---|
| 4,117,967 A * | 10/1978 | Regelson | ............... | B23K 1/018 137/596.17 |
| 4,241,750 A * | 12/1980 | Furuse | ................ | G05D 16/204 137/101.19 |
| 4,244,396 A * | 1/1981 | Friedland | ............ | F15B 11/0426 137/487.5 |
| 4,253,480 A * | 3/1981 | Kessel | ................... | G05B 11/28 137/102 |
| 4,394,871 A * | 7/1983 | Czajka | ................. | G05B 19/075 137/115.25 |
| 4,638,837 A * | 1/1987 | Buike | ..................... | B62D 5/06 137/596.16 |
| 4,813,339 A * | 3/1989 | Uno | .................... | F15B 11/0426 318/599 |
| 4,835,970 A | 6/1989 | Shimamura et al. | | |
| 4,887,636 A * | 12/1989 | Rothen | ................... | B60T 8/327 137/487.5 |
| 4,904,027 A * | 2/1990 | Skantar | ................... | B60T 13/58 303/15 |
| 4,961,441 A * | 10/1990 | Salter | ................. | G05D 16/2053 137/14 |
| 5,020,564 A * | 6/1991 | Thoman | ............. | G05D 16/2053 137/102 |
| 5,269,341 A * | 12/1993 | Nusz | .................. | G05D 16/2033 137/12 |
| 5,313,873 A * | 5/1994 | Gall | ........................... | F15B 1/02 137/596.17 |
| 5,426,874 A * | 6/1995 | Nakata | ................... | E02F 3/844 37/348 |
| 5,499,647 A * | 3/1996 | Robert | ............... | G05D 16/2093 137/12 |
| 5,813,226 A * | 9/1998 | Krone | .................... | E02F 9/2296 60/327 |
| 5,954,089 A * | 9/1999 | Seymour | ............. | F16K 31/0675 137/487.5 |
| 6,216,456 B1* | 4/2001 | Mitchell | ............... | E02F 9/2217 417/212 |
| 6,338,358 B1* | 1/2002 | Watanabe | .......... | G05D 16/2093 137/102 |
| 6,356,811 B1* | 3/2002 | Beselt | ................ | G05D 16/2053 700/13 |
| 6,851,350 B2* | 2/2005 | Lissel | .................... | F15B 20/005 91/426 |
| 6,860,284 B2* | 3/2005 | Wuerth | .................... | B60T 8/326 137/15.06 |
| 7,505,818 B1* | 3/2009 | Kohler | .................... | G05B 11/28 137/102 |
| 8,118,256 B2* | 2/2012 | Cahill | .................... | B60T 13/662 244/111 |
| 2002/0117214 A1* | 8/2002 | Tucker | ............... | G05D 16/2053 137/487.5 |
| 2003/0038221 A1* | 2/2003 | Fu | ......................... | B60N 2/0228 248/421 |
| 2004/0186630 A1* | 9/2004 | Shier | ................. | G05D 16/2053 700/301 |
| 2005/0061373 A1* | 3/2005 | McLaughlin | ...... | G05D 16/2053 137/565.13 |
| 2008/0105789 A1* | 5/2008 | Smith | .................... | B64G 1/401 244/171.1 |
| 2010/0309601 A1* | 12/2010 | Shvartsman | .............. | H01F 7/18 361/186 |
| 2011/0049970 A1* | 3/2011 | Hironaka | .............. | B60T 8/4081 303/6.01 |
| 2013/0111897 A1 | 5/2013 | Kuhlman | | |
| 2014/0358304 A1* | 12/2014 | Muir | .................. | G05D 16/2095 700/283 |
| 2016/0306370 A1* | 10/2016 | Shan | .................. | G05D 16/2053 |

FOREIGN PATENT DOCUMENTS

| | | |
|---|---|---|
| DE | 10 2009 057 359 | 6/2010 |
| DE | 10 2011 118 651 | 5/2013 |
| DE | 10 2013 205 961 | 10/2014 |
| DE | 10 2013 016 759 | 4/2015 |
| EP | 2 431 640 | 3/2012 |

\* cited by examiner

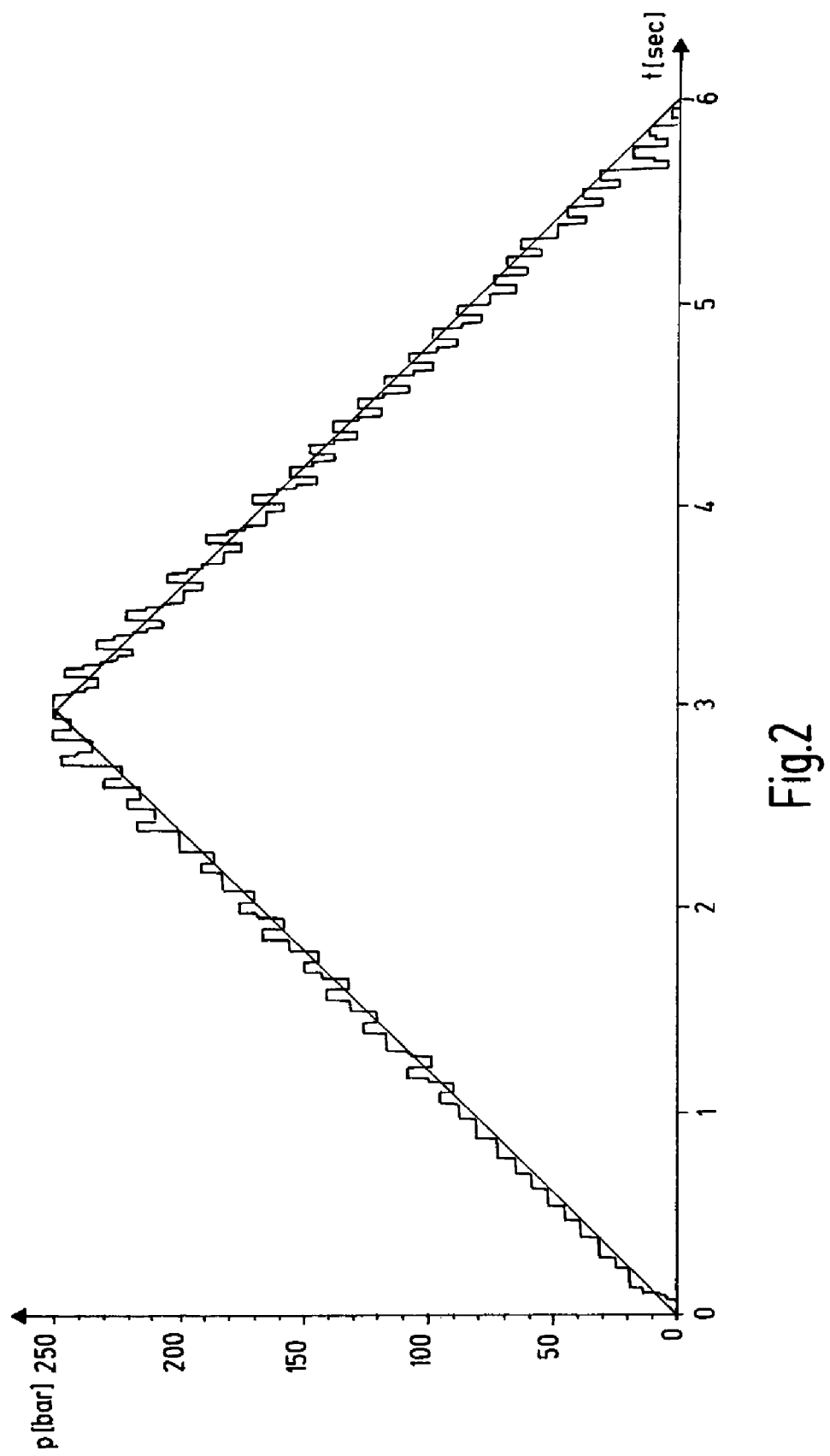

PRESSURE CONTROL DEVICE

FIELD OF THE INVENTION

The invention relates to a pressure control device for the continuous adjustment of hydraulic systems.

BACKGROUND OF THE INVENTION

Proportional valves are typically used for continuous adjustment of a hydraulic system. The proportional valves are control devices with an electrical input signal that, once a control instruction is provided, adjust a hydraulic system with a continuously varying signal in order to continuously influence the output parameter of the control loop, for example in form of the force of a hydraulic power cylinder.

The input element for the electrical signal, in particular in the form of electrical current, is the proportional solenoid, which converts an electrical signal into a force. The proportional solenoid applies, via the magnetic field it generates, a force to a ferromagnetic body, commonly in the form of an armature. By adapting the control geometry in conjunction with a non-magnetic zone, the magnetic force-stroke characteristic can vary such that an almost path-independent constant magnetic force can be generated. The non-magnetic zone is generated in a conventional manner by a welding process, which must be monitored at great expense in order to obtain consistent quality. The electrical signal is generated by an amplifier with internal current control. The resistance change of the coil is compensated for by the electric current, and the influencing of the current is compensated by the movement of the ferromagnetic armature in the magnetic field. It is usually necessary to use an overlaid dither to reduce friction. These measures for the reduction of friction on the electrical side of the valve then in turn necessitate suitable measures in the mechanical portion of the proportional valve, such as in the mounting of the ferromagnetic armature as well as very precisely machined surfaces for guiding the mechanical components.

In order to avoid the disadvantages of proportional valves described above, document EP 2 431 640 A2 discloses a method for controlling a ballistic movement of a barrier element of a valve. The retaining element is formed for blocking a flow cross-section of the valve. The barrier element can be switched to a first switch position and a second switch position. The barrier element occupies the first switch position in a rest position. The barrier element is moved out of its rest position in response to an activation signal.

This method known per se is used in a hydraulic control system for the supply and accurately timed dispensing of an accurate amount of lubricant to a lubrication point in a large 2-stroke diesel engine. The lubricant quantity is dispensed via a 2/2-way valve, which is ballistically controlled. This means that the valve is controlled via current pulses of short duration, which pulses are generally not sufficient to bring the valve piston to its end position in the instance of full opening. The opening stroke occurs ballistically, that is, the piston is pushed in the opening direction by the pulse-like magnet actuation. Under the action of the valve spring, which acts against this opening movement and the flow force applied at the valve, the piston falls back into its closed end position. The duration of the pulse determines the amount of oil dispensed for each ballistic opening stroke. With the described operating mode with the known control method, average volume flow can be set, which flows can for example be less than the nominal volume flow of the basic valve by a factor of $\frac{1}{10000}$.

SUMMARY OF THE INVENTION

Based on this prior art, an object of the invention is to provide commercial proportional pressure control valves that are simplified with respect to their valve behaviour, and then, can be realised cost-effectively and functionally reliable by using other structure.

This object is basically met by a pressure control device that exhibits at least the following features:
  two selector valves that are preferably leak-proof,
  one control device,
  one sensor device, in particular a pressure sensor device, and
  one voltage supply device.

The solution according to the invention permits a particularly simple, continuous adjustment of the output parameter of a control loop with selector valves, preferably with leak-proof selector valves, and without complex amplifier electronics. The solution according to the invention permits a low-wear switching of the respective valve. Any non-linearity that occurs is influenced by the control device in such a way that a continuous adjustment is in any case achievable. The pressure control device according to the invention is particularly efficient at handling hydraulic energy.

The selector valves used according to the invention are significantly easier to realize than proportional valves with respect to the design of the magnetic system. In particular the control cone system can be realized more easily, because substantially horizontally extending force-stroke characteristics do not necessarily have to be observed, as in the case of the proportional pressure control valve. Any variations regarding the magnetic force, which are caused through the welding process and the production in the proportional valves known per se, do not play a role as long as a minimum force is achieved. The same also applies to the variance in the magnetic force line in series production. In addition, there is no need for a conventional mounting of the armature with a DU bearing to reduce friction, or for the dither control.

A combination with one or several sensor devices, in particular using at least one pressure sensor, and a suitable microprocessor unit, makes it possible to easily reproduce fully functional proportional valves. Processors with a lower clock frequency are sufficient, which helps to reduce the costs for the entire pressure control device.

The control circuit used in the context of the pressure control device includes the control device itself, the actuator that, in a conventional manner, has the actual solenoid valve and a valve driver, the hydraulic system and the already mentioned sensor. This sensor of the sensor devices sends the currently measured value or actual value as a signal to the microprocessor. This microprocessor then compares this actual value with the nominal value, which arrives at the microprocessor from a higher-order input point. Depending on the magnitude of the error e, produced by the difference of the nominal value and the actual value, the microprocessor determines the additional switching method for the two valves used. Due to this system, a proportional behaviour of a proportional pressure control valve is obtained with two simple selector valves. Unlike proportional valves, such selector valves have no hysteresis, and a pressure minimization function, a pressure limitation or pressure control can be easily realized with the pressure control device according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale:

FIG. 2 is a graph of the chronological pressure curve in the instance of pressure control using a pressure control device according to FIG. 1.

DETAILED DESCRIPTION OF THE INVENTION

Figure 1:
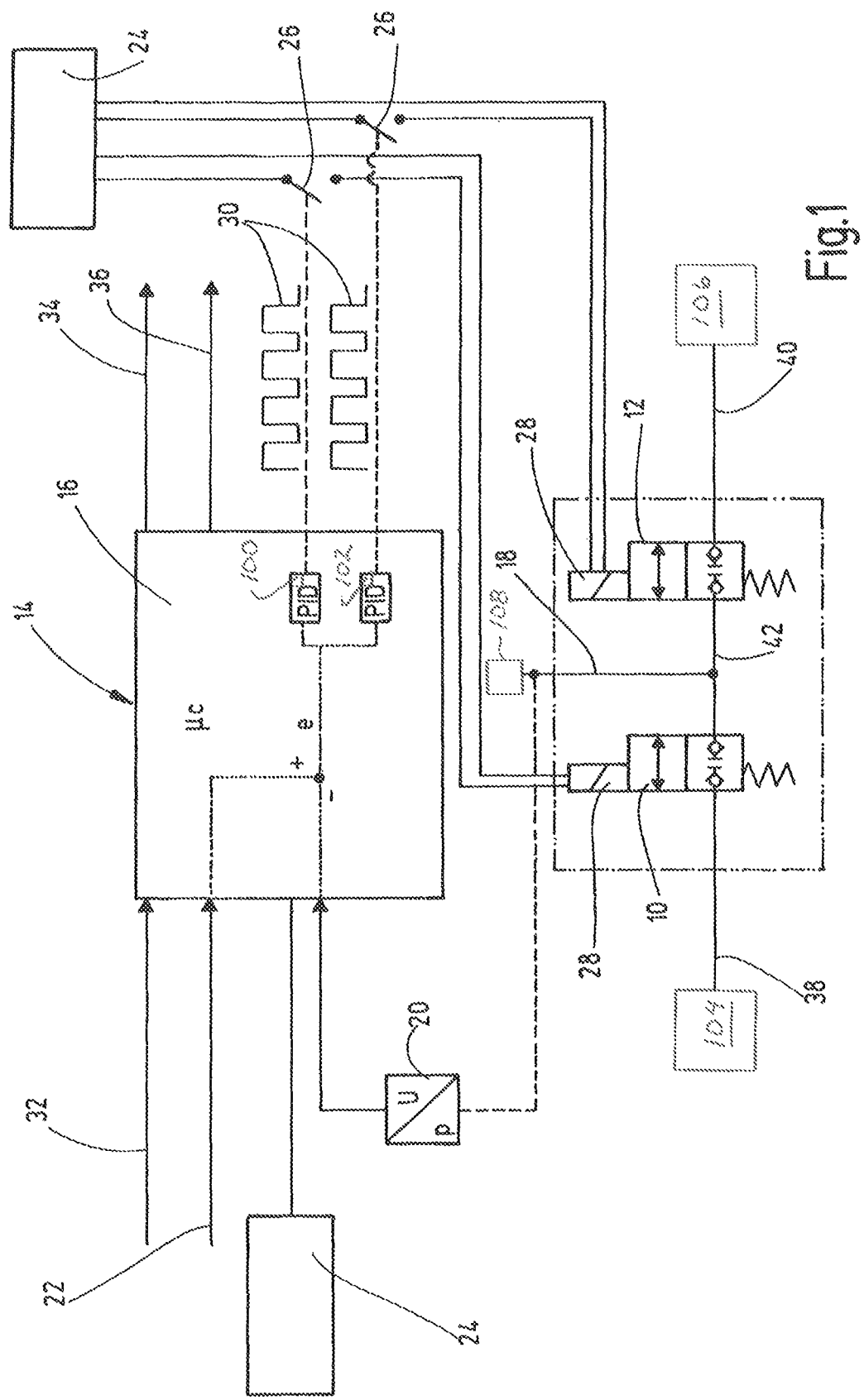
FIG. 1 is a schematic electric and hydraulic circuit diagram of the basic design of the pressure control device according to an exemplary embodiment of the invention.

The function of a commercial proportional pressure control valve shall firstly be briefly explained, which function is also to be realized with the pressure control device according to the invention. Such pressure controllers are usually pressure controllers with a slide design. In the de-energized state, the pressure supply connection or pump connection is closed. Furthermore, the consumer connection is connected to the tank connection in a fluid-conducting or fluid communication manner. If a current signal is now applied to the proportional solenoid of the pressure control valve, the magnet presses with a force corresponding to the strength of the current on the control piston of the valve. The control piston is then moved against a return spring, and the hydraulic oil flows from the pressure supply connection or pump connection to the consumer connection. Due to a hydraulic consumer that is connected to the consumer connection, for example, in the form of a directional slide valve, pressure builds up at the consumer connection, which can, for example, act on a pressure indicating pin of the proportional pressure control valve and, to this extent, generates a force counteracting the force of the proportional solenoid. This pressure in turn produces a movement of the control piston with the pressure indicating pin moved back into the above-described starting position, which results in the reduction of inflow from the pressure supply connection or pump connection until the pressure applied at the consumer connection once again corresponds to the magnetic force minus the spring force of the return spring, and thus, the pressure value setting to the applied current signal. If the connected consumer does not require any more pressurised fluid at the consumer connection, for example because the directional slide valve is at the end-stop, the control piston moves back further and closes the inlet bore.

If, due to the pressure relief of the consumer at the consumer connection of the valve, the output pressure falls below the pressure setting, the armature once more presses the control piston into a control position, and the control process begins again. The maximum achievable control pressure is in principle defined by the magnetic force of the proportional solenoid. If the pressure at the consumer connection rises above the specified value, the control piston is moved with the armature in such a way that the connection from the consumer connection to the tank connection is opened. This movement of the control piston limits the pressure at the consumer connection. In the instance of an interruption of the control current, the control piston is drawn back by the pressure at the consumer connection and by the return spring. The consumer connection is then connected to the tank connection, and the consumer pressure at the consumer connection drops to the tank level applied at the tank connection.

The above-described known pressure control function for a commercial proportional pressure control valve shall now be reproduced according to the invention with two leak-proof 2/2-way selector valves (i.e., non-proportional 2-way/2-position selector valves). These 2/2-way selector valves permit a leakage-free blocking of the hydraulic consumer connected to these valves, are only settable in fully open and fully closed positions and are not settable in intermediate positions between the fully open and fully closed positions while performing pressure control.

To provide further clarification, reference is made to the depiction according to FIG. 1, which shows the essential components of the pressure control device according to the exemplary embodiment of the invention. The pressure control device includes of two selector valves 10, 12, which are preferably formed to be leak-proof or leak-resistant as 2/2-way selector valves. In the depicted embodiment according to FIG. 1, the first selector valve 10 is used to perform a pressure minimization function, and the second selector valve 12 serves to perform a pressure limiting function. The pressure control device according to the invention also comprises a control device or unit 14 with a computer 16, preferably in the form of a microprocessor pc. The control algorithm executed on the microprocessor μc permits a control function, in particular in the form of PID control, both for the first selector valve 10 and for the second selector valve 12. A pressure supply line 18 feeds in between the two selector valves 10, 12, which pressure supply line leads to a hydraulic consumer 108 and leads for example to the piston side of a hydraulic power cylinder or to a hydraulic motor. Connected to the pressure supply line 18 is a sensor device 20, in particular in the form of a commercial pressure sensor, which converts the respective consumer pressure applied in the pressure supply line 18 into an actual voltage value, which serves as the input value for the control device 14. This actual voltage value is compared with another input value of the control device 14 in the form of the nominal value setting 22 within the microprocessor μc by the control algorithm. The nominal value setting 22 corresponds to a further voltage value, which results from a nominal pressure setting corresponding, for example, to the extended piston/rod unit of said hydraulic power cylinder under load. Electric current values can also be used instead of the voltage values.

In addition to a voltage supply 24 in the form of conventional voltage sources 24, the selector valves 10, 12 also require a valve driver 28, controlled by electronic switches 26 and actuating magnets connected thereto. The switches 26 are preferably controlled by field effect transistors 100, 102 (FET), which are components of the control device 14. The conventional transistors, which are not depicted in detail, receive their input signals from the already-mentioned PID control circuit for each of the selector valves 10, 12. The output signals of the PID controller are symbolically depicted in FIG. 1 in the form of square-wave signals 30. In addition, the control device 14 also has, for the purpose of effective operation, an additional input 32 for receiving an enable signal of a higher-order controller, which can also be a machine controller, and has two additional outputs 34, 36, one for detecting fault signals or for a detection of measured values, respectively. For effective operation of the pressure control device according to the invention, the first selector valve 10 needs to be connected at its input side to a pressure supply connection or pump connection 38 connected to a hydraulic pressure supply or pump 104. The second selector valve 12 has, on its output side, a tank connection 40 connected to a hydraulic tank 106, which is at tank pressure or ambient pressure. Furthermore, the first selector valve 10 is connected at its output side to a connecting line 42, which leads to the input side of the second selector valve 12. As described above, the pressure supply line 18 for the hydraulic consumer feeds into the connecting line 42 in a fluid-conducting manner.

The two selector valves 10, 12 constitute the control edges of the pressure control device. The one control edge, as the pump control edge, provides the pressure minimization function of the first selector valve 10. The other control edge, as the tank control edge, provides the pressure limiting function of the second selector valve 12. The PID controller, depicted at the top when viewing FIG. 1, undertakes the operation of the pressure minimizing function concerning the first selector valve. The lower PID controller undertakes the operation of the pressure limiting function for the second selector valve 12.

The pressure sensor 20 depicted in FIG. 1 as part of the pressure sensor device, measures at the hydraulic consumer, which is not depicted in detail, the actual pressure value via its pressure supply line 18. This actual pressure is fed into the control device 14 and is compared with the nominal value at the nominal value setting 22. Depending on the error e equalizing the nominal value minus the actual value, the control algorithm then determines which control edge must be opened to reach the desired nominal value and to thus minimize the control deviation. For this purpose, the control algorithm calculates the activation duration for the respective transistor and specifies the activation duration for the transistors or for the switch 26 respectively. If the error e is small, both valves 10, 12 are closed leakage-free. This closing is very advantageous from an energy perspective compared with the known proportional valves, because on the one hand there is no leakage in the direction of the tank connection 40, and thus, hydraulic energy is not wasted unnecessarily. Since the actuating magnets 28 comprise electrically powered coils, they are not required to be powered continuously to achieve the required operation of the pressure control device so that they will not heat up, which heating up would be undesirable for certain applications of the pressure control device.

The PWM (Pulse Width Modulated) frequency should preferably be significantly above the cut-off frequency of both valves 10, 12 as far as the mechanical design, as well as the actuating magnets 28 for the valves are concerned. A proportional valve only ever reacts to the pressure in the immediate proximity of the valve. With the proposed pressure control device according to the invention it is possible to sense the control variable itself at any location in the hydraulic system. Thus the control loop may be designed as required depending on the overall system and the desired control function.

To aid in the further description, reference is made to FIG. 2, which depicts a calculated pressure curve in bar (stepped curve progression) over time with a predetermined pressure ramp in form of a linearly progressing triangle. The pressure control device was in this instance connected to a closed, unchangeable volume (V=const.=0.15 l).

The digital pressure control valve according to FIG. 1, as described, of the two selector valves 10, 12, will be referred to below as two control edges. In this instance one pump control edge feeds oil from the pump (connection 38) to the consumer, and the control edge at the tank end transports oil from the consumer to the tank connection 40.

In order to change the pressure, the closing element of the control edge is opened according to the pressure-change speed $$\dot{p} = \frac{E}{V} \cdot \sum Q$$

that is, the control device 14 opens, depending on the error, the corresponding control edge so as to increase or decrease the pressure. The opening cross-section A results approximately from the equation $A \approx d \cdot \pi \cdot x$. In this equation, d represents the seat diameter of the respective valve, and the stroke x of the valve piston stands according to the above equation for the pressure-change speed dependent on the pressure differential $\Delta p$ between pump pressure and consumer pressure or respectively between consumer pressure and tank pressure. Moreover, the stroke x of the valve piston is also dependent on the modulus of elasticity E of the liquid as well as the consumer volume V. The opening stroke is primarily dependent on the pressure differential $\Delta p$; the smaller the pressure differential the larger is the stroke x. Pressure differentials of $\Delta p=0$ bar or $\Delta p<0$ bar result in the maximum opening of the respective valve 10, 12. In a simulation of the valve, all other parameters remained essentially constant. The stroke x of the respective valve 10, 12 is therefore not directly determined by the control device 14, but is, as explained, dependent on the described system parameters.

Since the selector valves 10, 12, which are used as part of the pressure control device according to the invention, are standard valves, there are to that extent no particular requirements concerning switching time or service life. They are otherwise characterized as low-wear components. Compared to conventional slide valves, the selector valves 10, 12 are rated as dirt-resistant. The valves 10, 12 are also rated as energy efficient due to low hydraulic losses, as well as a low power consumption in control mode. As shown in FIG. 1, if power is removed from the system, the respective valve 10, 12 is moved into the depicted shut-off position by a valve spring, which provides a fail-safe function.

With the proportional valves known per se it is only possible to control the pressure directly at the respective valve. With the proposed solution according to the invention, the pressure sensor of the sensor device 20 may be disposed in a place separate from the respective selector valve 10, 12. The selector valves 10, 12 themselves are commercially available and inexpensive. Moreover, the pressure control device according to the invention permits a flexible adaptation to different applications since the control device 14 is freely programmable through the microprocessor 16. None of the functions are performed by the mechanical arrangement.

While one embodiment has been chosen to illustrate the invention, it will be understood by those skilled in the art that various changes and modifications can be made therein without departing from the scope of the invention as defined in the claims.

The invention claimed is:

1. A pressure control device capable of continuous adjustment of hydraulic systems, the pressure control device comprising:
a control unit with first and second transistors forming first and second individual controllers, respectively, controlling a pressure limiting function, respectively;
leak-proof first and second selector valves controlled by first and second valve drivers having first and second electronic switches activated by said first and second transistors, respectively, said first and second selector valves forming a digital pressure control valve, being only settable in fully open and fully closed positions and not being settable in intermediate positions between the fully open and fully closed positions while performing pressure control;
a sensor in fluid communication with said first and second selector valves;
a first voltage supply electrically connected to said control unit; and
a hydraulic consumer connected in fluid communication to a hydraulic pressure supply line extending between and being in fluid communication with said first and second selector valves.

2. A pressure control device according to claim 1 wherein said transistors are field effect transistors.

3. A pressure control device according to claim 1 wherein said digital pressure control valve is electronically infinitely variable.

4. A pressure control device according to claim 1 wherein each of said first and second selector valves is a 2/2-way selector valve.

5. A pressure control device according to claim 1 wherein said control unit comprises a computer.

6. A pressure control device according to claim 5 wherein said computer is a microprocessor.

7. A pressure control device according to claim 5 wherein said computer provides a PID control function as a control algorithm.

8. A pressure control device according to claim 1 wherein said first and second selector valves represent first and second control edges undertaking the pressure reducing function and the pressure limiting function, respectively.

9. A pressure control device according to claim 8 wherein said control unit comprises a computer with a PID control function as a control algorithm; and
said sensor is a pressure sensor detecting an actual pressure value of said hydraulic consumer selectively in fluid communication with said first and second selector valves, said pressure sensor being connected to said control unit and providing said control unit with the actual pressure valve, said control unit comparing the actual pressure valve to a pre-selectable nominal value such that the control algorithm decides which of said first and second control edges is selected to provide an open fluid connection of the respective selector valves depending on an occurring error between the nominal pressure vale and the actual sensor value.

10. A pressure control device according to claim 9 wherein
each of said first and second valve drivers comprises an electromagnetic actuator via the respective electronic switch connect to a second voltage supply;
the control algorithm stipulates a respective activation time for each of said first and second electronic switches.

11. A pressure control device according to claim 10 wherein
each of said electromagnetic actuator is an actuating magnet.

12. A pressure control device according to claim 1 wherein
said control unit comprises a first PID controller controlling the pressure reducing function and a second PID controller controlling the pressure limiting function.

13. A pressure control device according to claim 1 wherein
said digital pressure control valve is characteristic of a proportional valve.

14. A pressure control device capable of continuous adjustment of hydraulic systems, the pressure control device comprising:
a control unit with first and second transistors forming first and second individual PID controllers, respectively, controlling a pressure reducing function and a pressure limiting function, respectively;
leak-proof first and second selector valves controlled by first and second valve drivers having first and second electronic switches activated by said first and second transistors as parts of said control device, respectively, said first and second selector valves forming a digital pressure control valve, being capable of only being set in fully open and fully closed positions and incapable of being set in intermediate positions between the fully open and fully closed positions while performing pressure control and being provided with the pressure reducing function and the pressure limiting function by said first and second PID controllers, respectively;
a sensor in fluid communication with said first and second selector valves;
a first voltage supply electrically connected to said control unit; and
a hydraulic consumer connected in fluid communication to a hydraulic pressure supply line extending between and being in fluid communication with said first and second selector valves.

15. A pressure control device according to claim 1 wherein
said first selector valve comprises an input port connected in fluid communication to a hydraulic pressure supply and an outlet port connected in fluid communication to said hydraulic pressure supply line; and
said second selector valve comprises an input port connected in fluid communication to said hydraulic pressure supply line and an outlet port connected in fluid communication to a hydraulic tank.

16. A pressure control device according to claim 14 wherein
said first selector valve comprises an input port connected in fluid communication to a hydraulic pressure supply and an outlet port connected in fluid communication to said hydraulic pressure supply line; and
said second selector valve comprises an input port connected in fluid communication to said hydraulic pressure supply line and an outlet port connected in fluid communication to a hydraulic tank.

* * * * *